United States Patent
Kim et al.

(10) Patent No.: US 8,165,521 B2
(45) Date of Patent: Apr. 24, 2012

(54) APPARATUS AND METHOD FOR SELECTING RELAY MODE OF RELAY STATION IN MULTIHOP RELAY BROADBAND WIRELESS COMMUNICATION SYSTEM

(75) Inventors: Do-Young Kim, Yongin-si (KR); Hak-Ju Lee, Incheon (KR); Dong-Seek Park, Yongin-si (KR); Sung-Kwon Hong, Seoul (KR); Seung-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 1340 days.

(21) Appl. No.: 11/657,415

(22) Filed: Jan. 24, 2007

(65) Prior Publication Data

US 2007/0190934 A1 Aug. 16, 2007

(30) Foreign Application Priority Data

Jan. 24, 2006 (KR) ........................ 10-2006-0007069

(51) Int. Cl.
*H04B 3/36* (2006.01)
(52) U.S. Cl. .............. 455/7; 455/11; 370/315; 370/316; 370/293; 370/492; 375/211
(58) Field of Classification Search ................ 455/7, 11; 370/210, 293, 390, 392, 492
See application file for complete search history.

(56) References Cited

U.S. PATENT DOCUMENTS

| | | | | |
|---|---|---|---|---|
| 7,035,677 B2 * | 4/2006 | Orlik et al. | | 455/574 |
| 7,929,988 B2 * | 4/2011 | Horiuchi et al. | | 455/550.1 |
| 2002/0071434 A1 * | 6/2002 | Furukawa | | 370/392 |
| 2004/0114555 A1 * | 6/2004 | Hayashi et al. | | 370/329 |
| 2004/0131025 A1 * | 7/2004 | Dohler et al. | | 370/328 |
| 2005/0249159 A1 | 11/2005 | Abraham et al. | | |
| 2006/0056534 A1 * | 3/2006 | Ionescu et al. | | 375/267 |
| 2008/0095121 A1 * | 4/2008 | Shattil | | 370/335 |
| 2008/0137581 A1 * | 6/2008 | Doppler et al. | | 370/315 |
| 2008/0274692 A1 * | 11/2008 | Larsson | | 455/24 |
| 2009/0268662 A1 * | 10/2009 | Larsson et al. | | 370/328 |

OTHER PUBLICATIONS

Deng Shiqiang Recommendation on Design 802.16 TGe PMP mode backward compatible Frame Structure IEEE 802.16 Broadband Wireless Working Group, Sep. 9, 2005.*
Stefanov et. al, "Coopative Coding for wireless networks", IEEE Transactions in Communications, vol. 52, No. 9, Sep. 2004.*

* cited by examiner

*Primary Examiner* — Kamran Afshar
*Assistant Examiner* — Edward Zhang
(74) *Attorney, Agent, or Firm* — The Farrell Law Firm, P.C.

(57) ABSTRACT

A method for selecting a relay mode depending on channel status of relay links in a multihop relay broadband wireless communication system and a Relay Station (RS) apparatus for supporting the method. When signals are received from a Base Station (BS) and a Mobile Station (MS), channel status values (e.g., eigenvalue, mutual information, and probability error) of relay links (BS-RS link and RS-MS link) are estimated using the received signals. The estimated channel status values are compared with a preset reference value. According to a result of the comparison, the relay mode for relaying the received signals is selected. Accordingly, the reliability of the relayed signal can be enhanced and the capacity of the signal link can be increased.

24 Claims, 7 Drawing Sheets

APPARATUS AND METHOD FOR SELECTING RELAY MODE OF RELAY STATION IN MULTIHOP RELAY BROADBAND WIRELESS COMMUNICATION SYSTEM

PRIORITY

This application claims priority under 35 U.S.C. §119 to an application filed in the Korean Intellectual Property Office on Jan. 24, 2006 and assigned Serial No. 2006-7069, the contents of which are incorporated herein by reference.

BACKGROUND OF THE INVENTION

1. Field of the Invention

The present invention generally relates to a multihop relay broadband wireless communication system, and in particular, to a method for relaying a signal by selecting a relay mode depending on a channel status of links between a Base Station, a Relay Station, and a Mobile Station in a multihop relay broadband wireless communication system, and a Relay Station apparatus for supporting the method.

2. Description of the Related Art

In fourth-generation (4G) mobile communication systems, cells having a very small radius are located to enable rapid communications and accommodate more traffic. However, it may be impossible to achieve a centralized design using current wireless network design schemes. Wireless networks should be controlled and deployed in a distributed manner, and actively adapt to environment changes, such as a joining of a new Base Station. To these ends, 4G mobile communication systems should be configured as autonomous adaptive wireless networks.

Techniques applied to an ad-hoc network are typically adopted by a mobile communication system for substantial implementation of an autonomous adaptive wireless network by a 4G mobile communication system. A representative example is a multihop relay broadband wireless communication system, in which a multihop relay scheme applied to an ad-hoc network is introduced to a broadband wireless communication system configured with a fixed Base Station. In the broadband wireless communication system, since communications are conducted through one direct link between a Base Station and a Mobile Station, it is easy to establish a highly reliable radio communication link between the Base Station and the Mobile Station.

However, since the wireless network configuration of the broadband wireless communication system has low flexibility because of the fixed Base Station, it is hard to provide efficient services in a radio environment, which is subject to severe change in traffic distribution or traffic. To overcome this shortcoming, it is possible to apply a relay scheme which delivers data in a multihop manner by use of neighboring Mobile Stations or Relay Stations. A multihop relay scheme can rapidly reconfigure the network under the environment change. Also, a multihop relay scheme can provide a Mobile Station with a radio channel of better channel status by building a multihop relay path by way of a repeater which is placed between the Base Station and the Mobile Station. Furthermore, a high speed data channel can be provided to Mobile Stations which cannot communicate with the Base Station in a shadow area, by means of the multihop relay path, to thereby expand the cell area.

FIG. 1 depicts a multilink configuration of a general multihop relay broadband wireless communication system.

As shown in FIG. 1, a Mobile Station (MS) 110 in a coverage 101 of a Base Station (BS) 100 is connected to BS 100 through a direct link. In contrast, a MS 120 with poor channel status, which resides outside the coverage 101 of BS 100, is connected to a relay link via a Relay Station (RS) 130.

When MSs 110 and 120 suffer poor channel status because they are outside the coverage 101 of BS 100 or in a shadow area under the severe shielding by buildings, BS 100 is able to provide better radio channels to MSs 110 and 120 by means of RS 130. Accordingly, by adopting the multihop relay scheme, BS 100 can provide a high speed data channel in the boundary area of the poor channel status and expand the cell service area. To transmit uplink (UL) and downlink (DL) communications between the BS 100, the RS 130, and the second MS 120, a BS-RS link between the BS 100 and the RS 130, an RS-MS link between the RS 130 and the second MS 120, and a BS-MS link between the BS 100 and the first MS 110 are established. Each link is divided to the UL or the DL according to the data transmission path. The respective links (BS-RS link, RS-MS link, and BS-MS link) are established independently from one another.

To relay signals between the BS and the MS, the RS adopts an Amplify and Forward (AF) scheme or a Decode and Forward (DF) relay scheme. The AF scheme and the DF scheme work using different Open System Interconnection (OSI) layers, as shown in FIG. 2.

FIG. 2 depicts the OSI layer structure of a general RS for performing relay modes. The OSI layers employ the OSI layers of Institute of Electrical and Electronics Engineers (IEEE) 802.11a.

As shown in FIG. 2, being processed in a Physical Medium Dependent (PMD) sublayer and a Packet Level Control Protocol (PLCP) sublayer of a physical layer, the AF scheme merely amplifies and forwards the received signal.

Being processed in the Medium Access Control (MAC) layer as well as the physical layer, the DF scheme decodes and forwards the received signal after encoding and modulating the received frame. Advantageously, the DF scheme can obtain an additional coding gain by encoding the received signal differently from the coding scheme of the received signal depending on the channel status of the BS-RS link and the RS-MS link.

As discussed above, in the multihop relay broadband wireless communication system, the respective links (BS-RS link, RS-MS link, and BS-MS link) are established independently from one another. The RS relays the signal using a preset relay scheme (e.g., AF scheme or DF scheme).

Using an AF relay scheme, when the channel status of the BS-RS link and the RS-MS link are good, the RS can relay the signal. However, under a poor channel status of the RS-MS link, the RS merely amplifies the signal of the same modulation and coding as in the BS-RS link of the good channel status, and forwards it. As a result, the MS is not able to detect the relayed signal.

In the event of a poor channel status of the BS-RS link, the RS merely amplifies and forwards the signal distorted in the BS-RS link to the MS, to thus amplify the noise as well.

SUMMARY OF THE INVENTION

An aspect of the present invention is to substantially solve at least the above problems and/or disadvantages and to provide at least the advantages below. Accordingly, an aspect of the present invention is to provide a method for relaying a signal by selecting a relay mode depending on channel status between a BS, an RS, and an MS in a multihop relay broadband wireless communication system, and an RS apparatus for supporting the method.

Another aspect of the present invention is to provide a method for relaying a signal by selecting a relay mode depending on eigenvalue or mutual information between a BS, an RS, and an MS in a multihop relay broadband wireless communication system, and an RS apparatus for supporting the method.

A further aspect of the present invention is to provide a method for relaying a signal by selecting a relay mode depending on an eigenvalue or mutual information between a BS, an RS, and an MS with respect to each antenna in a multihop relay broadband wireless communication system, and an RS apparatus for supporting the method.

The above aspects are achieved by providing a method for selecting a relay mode at an RS in a multihop relay broadband wireless communication system, which includes estimating channel status values of relay links using signals received from a BS and an MS, and selecting a relay mode for relaying the received signals by comparing the estimated channel status values with a reference value.

According to one aspect of the present invention, a method for selecting a relay mode in an RS of a multihop relay Multiple Input Multiple Output (MIMO) system, includes estimating channel status values of relay links for respective antennas using signals received from a BS and an MS, and selecting a relay mode for relaying the received signals for the respective antennas by comparing the estimated channel status values with a reference value.

According to another aspect of the present invention, an RS apparatus for selecting a relay mode in a multihop relay broadband wireless communication system, includes a receiver which receives signals from a BS and an MS; a channel estimator which estimates channel status values of relay links using the received signals; a relay mode selector which selects the relay mode by comparing the estimated channel status values of the relay links with a reference value; and a transmitter which relays the received signals depending on the selected relay mode.

According to a further aspect of the present invention, an RS apparatus for selecting a relay mode in a multihop relay wireless communication system, includes a receiver which receives signals from a BS and an MS using at least two antennas; a channel estimator which estimates channel status values of relay links for the respective antennas using the received signals; a relay mode selector which selects a relay mode for the respective antennas by comparing the estimated channel status values of the relay links with a reference value; and a transmitter which relays the received signals via the at least two antennas depending on the selected relay mode.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Descriptions provide a technique for selecting a relay mode depending on channel status of relay links in a multihop relay broadband wireless communication system. The relay mode includes Amplify and Forward (AF), Decode and Forward (DF), Selection Decode and Forward (SDF), and Incremental Amplify and Forward (IAF). The AF scheme and the DF scheme are for understanding. The relay links refer to a link between a BS and an RS (BS-RS link) and a link between the RS and an MS (RS-MS link).

The following explanation relates to a Multiple Input Multiple Output (MIMO) Orthogonal Frequency Division Multiple Access (OFDMA) wireless communication system. The present invention is applicable to other multiple access schemes.

Figure 1:
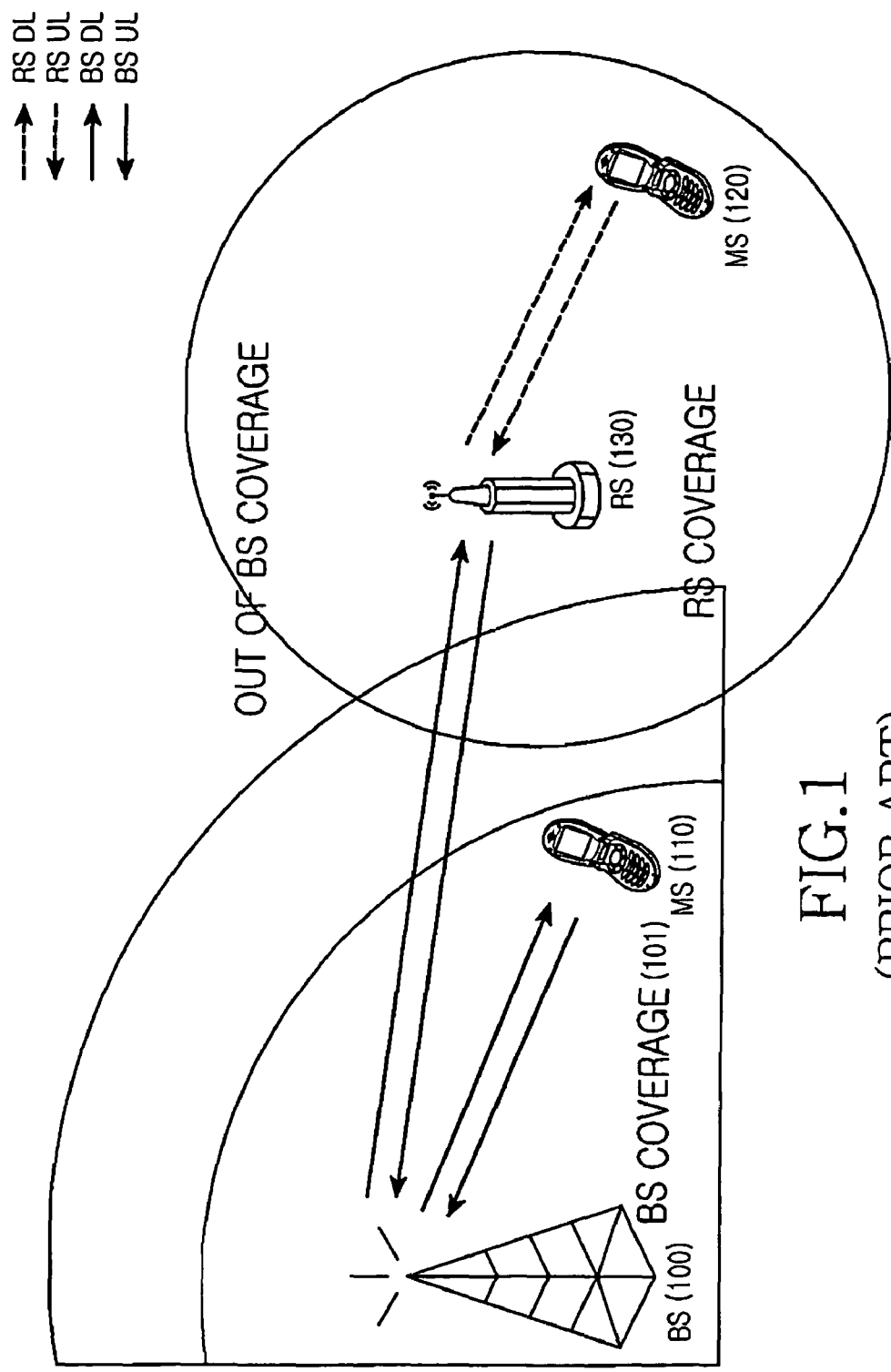
FIG. 1 depicts a multilink configuration of a general multihop relay broadband wireless communication system.
Figure 2:
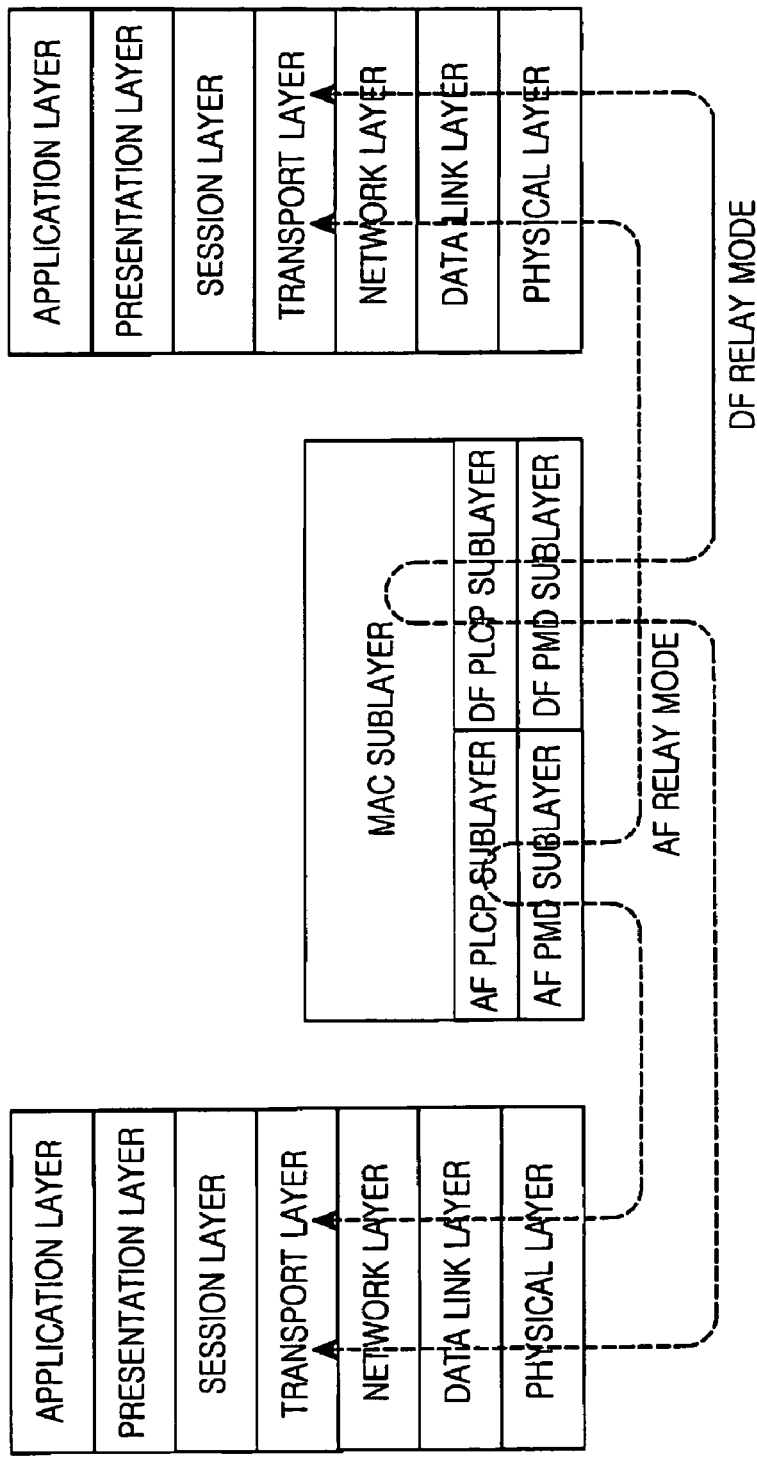
FIG. 2 depicts an OSI layer structure for performing relay modes of a general RS.
Figure 3:
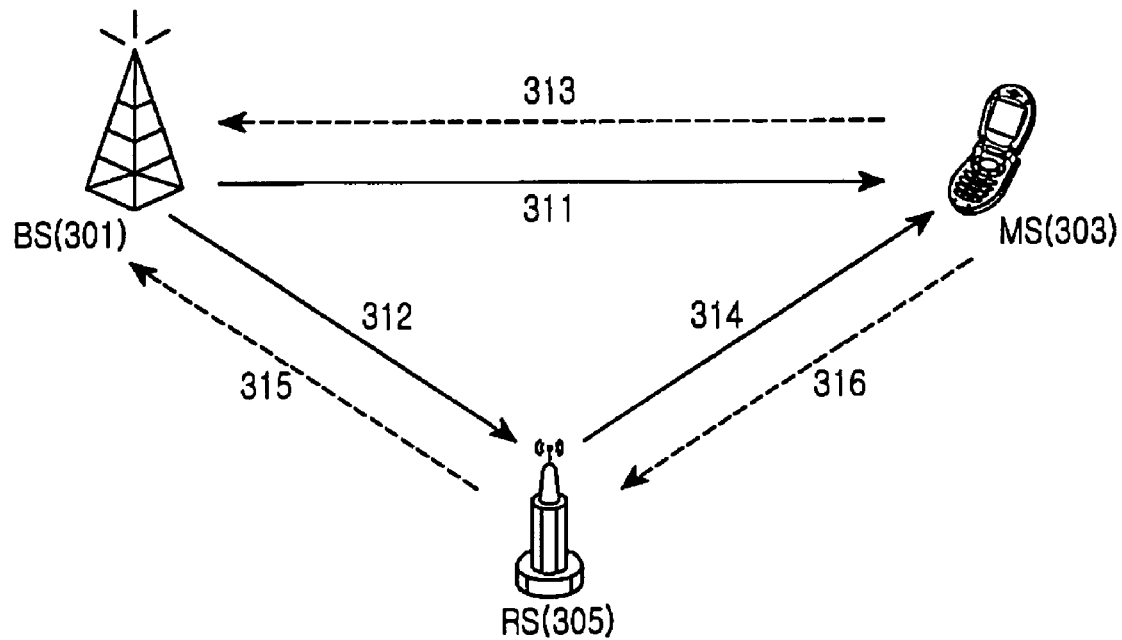
FIG. 3 depicts signal link flows for selecting a relay mode at an RS according to the present invention.

FIG. 3 depicts signal link flows for selecting a relay mode at an RS according to the present invention.

Referring to FIG. 3, a BS 301 sends a downlink (DL) signal to an MS 303 and an RS 305 in steps 311 and 312. The MS 303 sends an uplink (UL) signal to the BS 301 and the RS 305 in steps 313 and 316.

Upon receiving the DL signal from the BS 301, the RS 305 relays the DL signal to the MS 303 in step 314. Upon receiving the UL signal from the MS 303, the RS 305 relays the UL signal to the BS 301 in step 315. At this time, the RS 305 checks the channel status of the relay links (BS-RS link and RS-MS link) using the signals received from the BS 301 and the MS 303, selects a relay mode (AF scheme or DF scheme) based on the channel status of each link, and then relays the signals. Since the RS 305 has the multiple antennas, the channel status of each link is determined according to an eigenvalue between antennas, mutual information based on the eigenvalue, or probability error.

Figure 4:
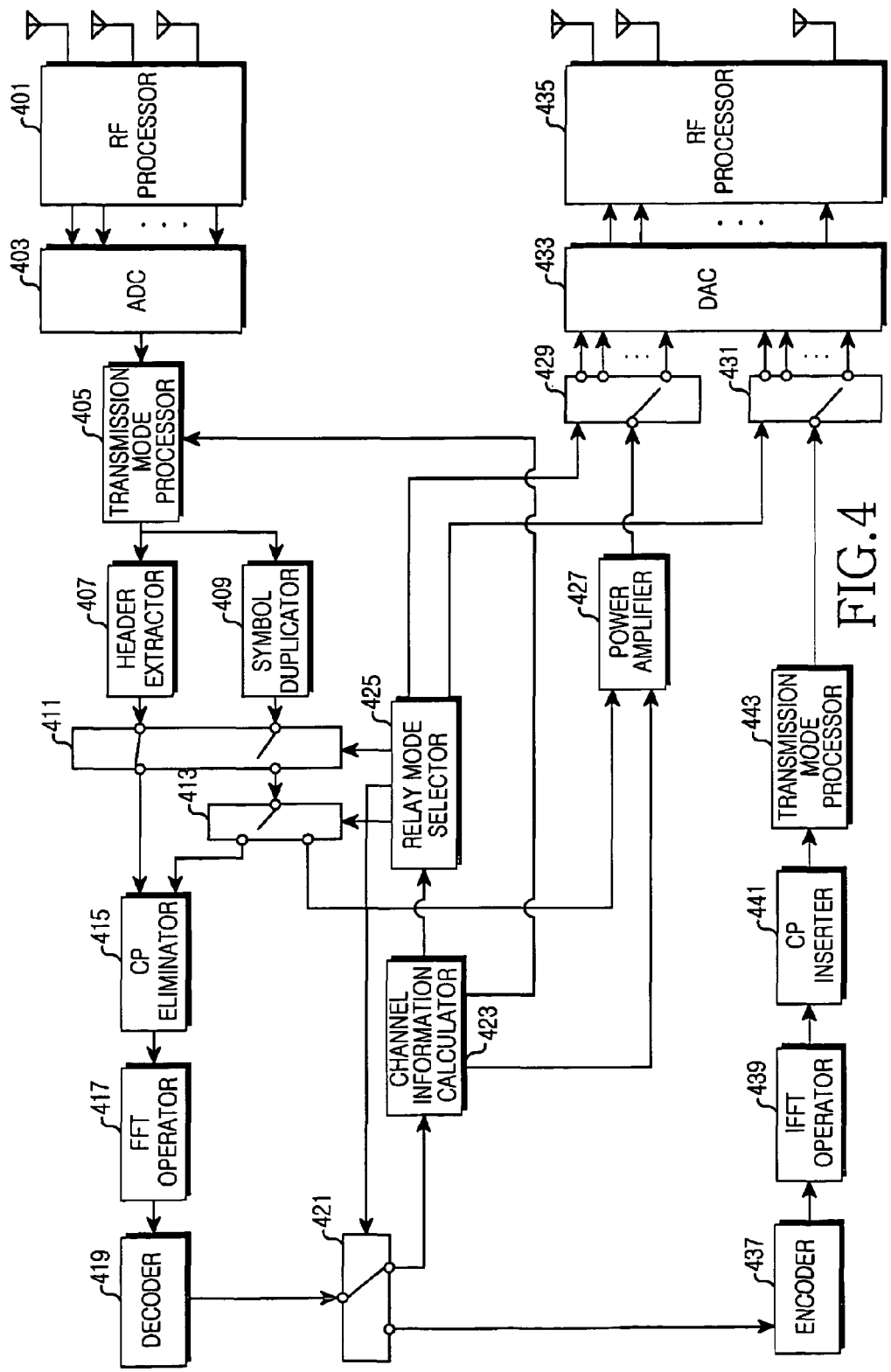
FIG. 4 is a block diagram of an RS transceiver apparatus for selecting a relay mode of a relay link in a multihop relay Multiple Input Multiple Output (MIMO) system according to the present invention.

FIG. 4 shows an RS transceiver apparatus for selecting a relay mode of a relay link in a multihop relay MIMO system according to the present invention.

As shown in FIG. 4, the RS includes a transmitter and a receiver.

The receiver includes a Radio Frequency (RF) processor 401, an Analog/Digital Converter (ADC) 403, a transmission mode processor 405, a header extractor 407, a symbol duplicator 409, switches 411, 413, and 421, a Cyclic Prefix (CP) eliminator 415, a Fast Fourier Transform (TTF) operator 417, a decoder 419, a channel information calculator 423, and a relay mode selector 425.

The RF processor 401 down-converts an RF signal, which is received at the MIMO antenna from the BS or the MS, to a baseband signal and then outputs the baseband signal. The ADC 403 digitizes the baseband analog signal fed from the RF processor 401.

The transmission mode processor 405 reprocesses the digital signal fed from the ADC 403 based on a transmission mode of the signal sent from the BS or the MS and outputs the reprocessed signal to the header extractor 407 and the symbol duplicator 409. The transmission mode includes diversity, multiplexing, and beam forming.

The header extractor 407 extracts a header from the signal provided from the transmission mode processor 405. The receiver can reduce a channel prediction time by predicting a channel using a pilot signal contained in the header extracted by the head extractor 407.

The symbol duplicator 409 duplicates the entire symbol of the signal provided from the transmission mode processor 405.

The first switch 411 selectively forwards the signals of the header extractor 407 and the symbol duplicator 409 to the next stage under the control of the relay mode selector 425. Specifically, to select a relay mode of the received signal, the first switch 411 channels the output signal of the header extractor 407 to the CP eliminator 415 under the control of the relay mode selector 425. Next, when the relay mode of the received signal is determined, the first switch 411 forwards the entire receive symbol duplicated at the symbol duplicator 409 to the second switch 413 under the control of the relay mode selector 425.

The second switch 413 sends the signal from the symbol duplicator 409 to the CP eliminator 415 or a power amplifier 427 according to the relay mode determined at the relay mode selector 425. Specifically, when the determined relay mode is the AF relay mode, the second switch 413 sends the signal from the symbol duplicator 409 to the power amplifier 427. When the determined relay mode is the DF relay mode, the second switch 413 sends the signal from the symbol duplicator 409 to the CP eliminator 415.

The CP eliminator 415 removes a CP from the output signal of the header extractor 407, which is fed from the switch 411, or from the output signal of the symbol duplicator 409, which is fed from the second switch 413.

The FFT operator 417 transforms the time domain signal fed from the CP eliminator 415 to a frequency domain signal through the FFT.

The decoder 419 demodulates and decodes the frequency domain signal fed from the FFT operator 417 according to the corresponding modulation level (Modulation and Coding Scheme (MCS) level).

The third switch 421 sends the decoded signal from the decoder 419 to either the channel information calculator 423 or the transmitter under the control of the relay mode selector 425. Under the control of the relay mode selector 425, the third switch 421 sends the header information decoded at the decoder 419 to the channel information calculator 423 to determine the relay mode. When the DF relay mode is selected, the third switch 421 sends the signal decoded at the decoder 419 to the transmitter under the control of the relay mode selector 425.

The channel information calculator 423 estimates channel information using the decoded header information fed from the third switch 421. Next, the channel information calculator 423 calculates eigenvalues for the respective antennas of the relay links (BS-RS link and RS-MS link) using the estimated channel information. Using the estimated channel information, the channel information calculator 423 issues control signals to control the transmission mode processor 405 and the power amplifier 427 of the transmitter.

The relay mode selector 425 selects the relay mode of the received signal by comparing the link eigenvalues fed from the channel information calculator 423 with a predefined reference value. For instance, the relay mode selector 425 selects the relay mode using the link eigenvalues as shown in FIG. 7.

Figure 7:
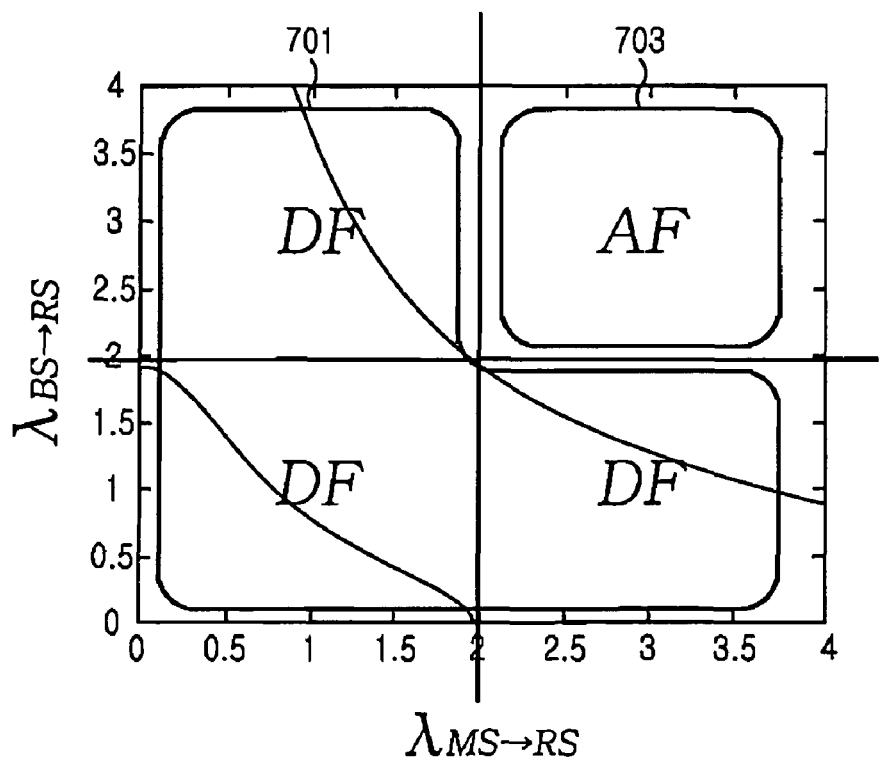
FIG. 7 depicts a standard for selecting the relay mode at the RS according to the present invention.

FIG. 7 depicts a standard for selecting the relay mode at the RS according to the present invention.

As shown in FIG. 7, the relay mode selector 425 selects the AF scheme 703 as the relay mode when the calculated link eigenvalues ($\lambda_{BS-RS}$ and $\lambda_{MS-RS}$) are greater than or equal to the reference value.

When at least one of the link eigenvalues is less than the reference value, the relay mode selector 425 selects the DF scheme 701 as the relay mode.

The relay mode selector 425 issues control information for controlling the switches 411, 413, 421, 429, and 431 of the transmitter and the receiver. Specifically, the relay mode selector 425 issues control signals to control the first switch 411 and the third switch 421 to select the relay mode of the received signal. Next, when the relay mode is determined, the relay mode selector 425 issues control signals to control the first switch 411 and the second switch 413 according to the determined relay mode. Also, to map the signals to be relayed to the respective antennas depending on the AF scheme or the DF scheme at the transmitter, the relay mode selector 425 issues control signals to control the fourth switch 429 and the fifth switch 431.

Now, the transmitter includes the power amplifier 427, the switches 429 and 431, a Digital/Analog Converter (DAC) 433, an RF processor 435, an encoder 437, an Inverse Fast Fourier Transform (IFFT) operator 439, a CP inserter 441, and a transmission mode processor 443.

When the relay mode is determined to the AF scheme, the power amplifier 427 amplifies the received signals for the respective antennas, which are fed from the second switch 413, under control of the channel information calculator 423 and then outputs the amplified signals.

The fourth switch 429 maps the signals amplified at the power amplifier 427 to the respective antenna paths under control of the relay mode selector 425.

When the relay mode is determined to the DF scheme, the encoder 437 encodes and modulates the encoded receive signals for the respective antennas, which are fed from the third switch 421, according to the corresponding modulation level (MCS level), and then outputs the encoded and modulated signals.

The IFFT operator 439 transforms the frequency domain signal fed from the encoder 437 to a time domain signal through the IFFT, and then outputs the time domain signal.

The CP inserter 441 inserts a CP to the data fed from the IFFT operator 439 to eliminate intersymbol interference which occurs due to the multipath fading of the radio channel, and outputs the CP-inserted data.

The transmission mode processor 443 converts and outputs the signal fed from the CP inserter 441 according to the corresponding transmission mode. The transmission mode includes diversity, multiplexing, and beam forming.

The fifth switch 431 maps the signal from the transmission mode processor 443 to the corresponding antenna path under control of the relay mode selector 425.

The DAC 433 receives the digital signals for the respective antennas from the fourth switch 429 or the fifth switch 431 and converts the digital signals to analog signals.

The RF processor 435 up-converts the baseband signals for the respective antennas, which are fed from the DAC 433, to RF signals and transmits the RF signals to the MS or the BS via the MIMO antenna.

According to the present invention, the RS selects the relay mode by calculating the eigenvalue. Alternatively, the channel information calculator 423 can include modules which calculate mutual information and probability error as well as the eigenvalue, and the RS can select the relay mode using the mutual information or the probability error as shown in FIG. 5.

Figure 5:
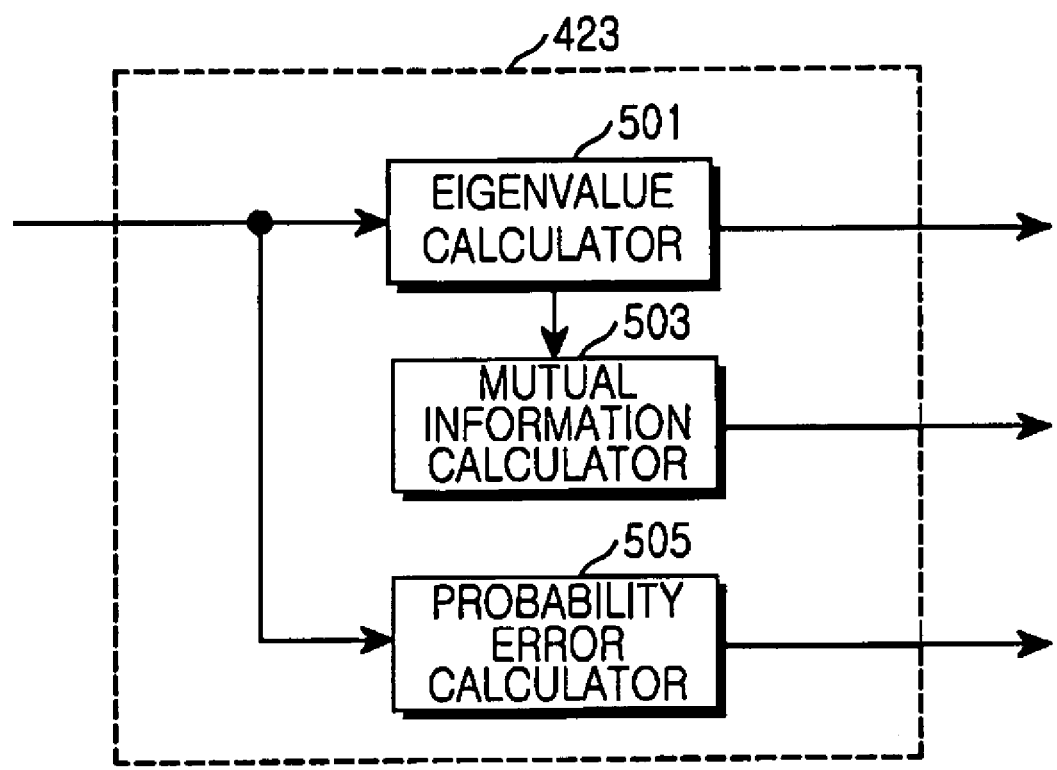
FIG. 5 is a block diagram of a channel information calculator in the multihop relay MIMO system according to the present invention.

Referring to FIG. 5, the channel information calculator 423 includes an eigenvalue calculator 501, a mutual information calculator 503, and a probability error calculator 505.

The eigenvalue calculator 501 calculates the eigenvalue from the estimated channel information using the decoded header information.

The mutual information calculator 503 calculates the mutual information using the acquired eigenvalue. The mutual information is expressed as Equation (1).

$$I_M = \log_2 det(I_{M_R} + E/M_T N_0 HH^H) \text{bps/Hz}, M_T, M_R = 1,2,3 \quad (1)$$

In Equation (1), $I_M$ denotes the mutual information, $I_{M_R}$ denotes a unit matrix, $E/M_T N_0$ denotes a Signal to Noise Ratio (SNR) of the received signal, and $M_T$ denotes the number of Tx antennas.

When the BS is aware of the channel status, $HH^H$ in Equation (1) can be expressed as the eigenvalue in Equation (2).

$$\begin{aligned} I_M &= \log_2 \prod_{m=1}^{n}(1 + E/M_T N_0|\lambda_m|^2) \\ &= \sum_{m=1}^{n} \log_2(1 + E/M_T N_0|\lambda_m|^2) \\ &\approx R \end{aligned} \quad (2)$$

In Equation (2), $I_M$ denotes the mutual information, $E/M_T N_0$ denotes the SNR of the received signal, and $M_T$ denotes the number of Tx antennas. $|\lambda_m|$ denotes an eigenvalue of the m-th largest $HH^H$ and n denotes a rank with respect to H.

The mutual information can be acquired using the eigenvalue based on Equation (2).

The probability error calculator 505 calculates a probability error value from the decoded header which is fed from the third switch 421.

Figure 6:
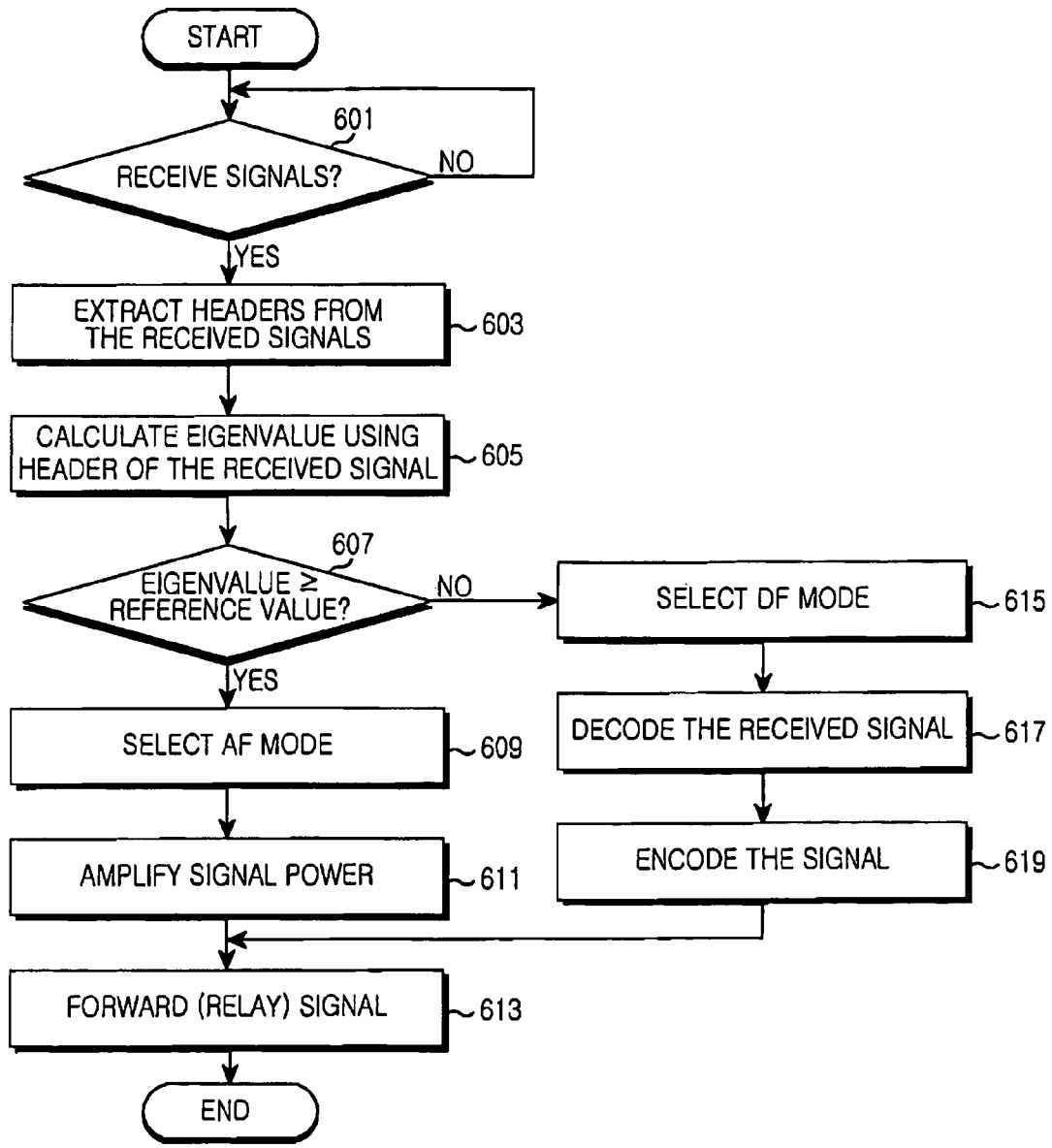
FIG. 6 is a flowchart outlining a relay mode selecting procedure at the RS according to the present invention.

FIG. 6 shows a relay mode selecting procedure at the RS according to the present invention. The following description explains that the relay mode is selected using the eigenvalue of the relay link by way of example.

Referring to FIG. 6, the RS checks whether signals are received from the BS and the MS in step 601.

Upon receiving the signals from the BS and the MS, the RS extracts headers from the received signals in step 603. In step 605, the RS calculates eigenvalues of the relay links (BS-RS link and RS-MS link) using pilot signals contained in the extracted headers of the received signals.

In step 607, the RS compares the acquired relay link eigenvalues with a preset reference value.

When each eigenvalue is greater than or equal to the reference value ($\lambda_{BS-RS}, \lambda_{MS-RS} \geq$ reference value), the RS selects the AF mode as the relay mode in step 609. For instance, when both eigenvalues of the BS-RS link and the MS-RS link are greater than or equal to the preset reference value, the RS selects the AF mode 703 as the relay mode, as shown in FIG. 7.

Upon selecting the AF mode as the relay mode, in step 611, the RS amplifies the power of the signal received from the BS or the MS according to the channel status value of each link which is estimated in step 605.

Next, in step 613, the RS transmits the power-amplified signal to the BS or the MS. That is, the RS amplifies the power of the signal received from the BS and then sends the amplified signal to the MS. Also, the RS amplifies the power of the signal received from the MS and sends the amplified signal to the BS. Next, the RS terminates the process.

By contrast, when each link eigenvalue is less than the reference value ($\lambda_{BS-RS}, \lambda_{MS-RS} <$ reference value), the RS selects the DF mode as the relay mode in step 615. For instance, when one of the eigenvalues of the BS-RS link and the MS-RS link is less than the preset reference value, the RS selects the DF mode 701 as the relay mode, as show in FIG. 7.

After selecting the DF mode as the relay mode, the RS demodulates and decodes the signals received in the respective links according to the corresponding modulation level (MCS level) in step 617.

After decoding the received signals, in step 619, the RS encodes the signals according to the channel status of the link in which the decoded signal is to be relayed. That is, the signal received from the BS is encoded and modulated according to the modulation level which is determined based on the channel status of the RS-MS link. The signal received from the MS is encoded and modulated according to the modulation level which is determined based on the channel status of the BS-RS link.

In step 613, the RS forwards the signal from the BS to the MS. Also, the RS forwards the signal from the MS to the BS. Next, the RS terminates the process.

It has been shown that the relay mode is selected by calculating the eigenvalue by way of example. Additionally, the relay mode can be selected using the mutual information or the probability error, which is acquired from the eigenvalue.

While the signals are relayed by selecting the relay mode for the respective antennas at the RS having the MIMO antenna, the RS having the single antenna can relay the signal by selecting the relay mode based on the channel status in the similar manner.

In a multihop relay broadband wireless communication system, an RS relays signals by selecting a relay mode based on channel status (e.g., eigenvalue, mutual information and probability error) of a BS-RS link and an RS-MS link. Thus, reliability of the relayed signal can be enhanced and capacity of the signal link can be increased. Furthermore, since the channel is estimated using merely the header of the received signal, it is possible to reduce a time taken to process the channel estimation.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for selecting a relay mode at a Relay Station (RS) in a wireless communication system, the method comprising:

estimating channel status values of relay links using signals received from a Base Station (BS) and a Mobile Station (MS); and selecting a relay mode for relaying the received signals by comparing the estimated channel status values with a reference value, wherein selecting the relay mode comprises:
comparing the estimated channel status values with the reference value;
selecting a Decode and Forward (DF) relay mode when at least one of the channel status values of the relay links is less than the reference value; and
selecting an Amplify and Forward (AF) relay mode when all of the channel status values of the relay links are greater than or equal to the reference value, and
wherein the relay links include a link between the BS and the RS and a link between the RS and the MS.

2. The method of claim 1, wherein the estimated channel status value is one of eigenvalue, mutual information, and probability error.

3. The method of claim 1, wherein the channel status value estimating step comprises:
extracting headers from the signals received from the BS and the MS; and
estimating channel status values of the relay links using the extracted headers.

4. The method of claim 1, wherein the relay mode is one of the AF mode, the DF mode, selection decode and forward (SDF) mode, and incremental amplify and forward (IAF) mode.

5. A method for selecting a relay mode in a Relay Station (RS) of a relay Multiple Input Multiple Output (MIMO) system, the method comprising:
estimating channel status values of relay links for respective antennas using signals received from a Base Station (BS) and a Mobile Station (MS); and
selecting a relay mode for relaying the received signals for the respective antennas by comparing the estimated channel status values with a reference value,
wherein selecting the relay mode comprises:
comparing the estimated channel status values with the reference value;
selecting a decode and forward (DF) relay mode, when at least one of the channel values of the relay links is less than the reference value; and
selecting an amplify and forward (AF) relay mode, when all of the channel status values of the relay links are greater than or equal to the reference value, and
wherein the relay links include a link between the BS and the RS and a link between the RS and the MS.

6. The method of claim 5, wherein the estimated channel status value is one of eigenvalue, mutual information, and probability error.

7. The method of claim 5, wherein the channel status value estimating step comprises:
extracting headers from the signals received from the BS and the MS via the respective antennas; and
estimating channel status values of relay links for the respective antennas using the extracted headers.

8. The method of claim 5, wherein the relay mode is one of the AF mode, the DF mode, selection decode and forward (SDF) mode, and incremental amplify and forward (IAF) mode.

9. A Relay Station (RS) apparatus for selecting a relay mode in a wireless communication system, comprising:
a receiver which receives signals from a Base Station (BS) and a Mobile Station (MS);
a channel estimator which estimates channel status values of relay links using the received signals;
a relay mode selector which selects the relay mode by comparing the estimated channel status values of the relay links with a reference value; and
a transmitter which relays the received signals depending on the selected relay mode,
wherein the relay mode selector compares the estimated channel status values of the relay links with the reference value, selects a Decode and Forward (DF) relay mode, when at least one of the estimated channel values of the relay links is less than the reference value, and selects an Amplify and Forward (AF) relay mode, when all of the estimated channel status values of the relay links are greater than or equal to the reference value, and
wherein the relay links include a link between the BS and the RS and a link between the RS and the MS.

10. The RS apparatus of claim 9, wherein the receiver comprises:
a header extractor which extracts headers from the received signals;
a symbol duplicator which duplicates and stores the received signals;
a first switch which selects and outputs an output signal of the header extractor and an output signal of the symbol duplicator under control of the relay mode selector;
a Fast Fourier Transform (FFT) operator which FFT-processes the output signal of the header extractor or the symbol duplicator from the first switch; and
a decoder which decodes the FFT-processed signal fed from the FFT operator.

11. The RS apparatus of claim 10, wherein the first switch connects the header extractor to the FFT operator to select the relay mode under the control of the relay mode selector, connects the symbol duplicator to the transmitter, when the AF mode is selected as the relay mode, and connects the symbol duplicator to the FFT operator, when the DF mode is selected as the relay mode.

12. The RS apparatus of claim 9, wherein the channel estimator estimates one of an eigenvalue and mutual information of the relay links by receiving header information of the received signals.

13. The RS apparatus of claim 9, wherein the relay mode selector selects one of the AF mode, the DF mode, a selection decode and forward (SDF) mode, and incremental amplify and forward (IAF) mode as the relay mode.

14. The RS apparatus of claim 13, wherein the transmitter comprises:
a power amplifier which amplifies power of the received signals when the AF mode is selected as the relay mode;
an encoder which encodes the received signals when the DF mode is selected as the relay mode; and
an Inverse Fast Fourier Transform (IFFT) operator which IFFT-processes the encoded signals.

15. The RS apparatus of claim 14, wherein the power amplifier amplifies power of the received signals according to channel status of the relay links.

16. The RS apparatus of claim 14, wherein the encoder encodes the received signals according to channel status of the relay links.

17. A Radio Station (RS) apparatus for selecting a relay mode in a wireless communication system, comprising:
a receiver which receives signals from a Base Station (BS) and a Mobile Station (MS) using at least two antennas;
a channel estimator which estimates channel status values of relay links for the respective antennas using the received signals;

a relay mode selector which selects a relay mode for the respective antennas by comparing the estimated channel status values of the relay links with a reference value; and a transmitter which relays the received signals via the at least two antennas depending on the selected relay mode, wherein the relay mode selector compares the estimated channel status values of the relay links for the respective antennas with the reference value selects a Decode and Forward (DF) relay mode, when at least one of the estimated channel values of the relay links is less than the reference value, and selects an Amplify and Forward (AF) relay mode, when all of the estimated channel status values of the relay links are greater than or equal to the reference value, and wherein the relay links include a link between the BS and the RS and a link between the RS and the MS.

18. The RS apparatus of claim 17, wherein the receiver comprises:
   at least two antennas;
   a header extractor which extracts headers from the signals received via the antennas;
   a symbol duplicator which duplicates and stores the received signals;
   a first switch which selects and outputs an output signal of the header extractor and an output signal of the symbol duplicator under control of the relay mode selector;
   a Fast Fourier Transform (FFT) operator which FFT-processes the output signal of the header extractor or the symbol duplicator from the first switch; and
   a decoder which decodes the signal fed from the FFT operator.

19. The RS apparatus of claim 18, wherein the first switch connects the header extractor to the FFT operator to select the relay mode under the control of the relay mode selector, connects the symbol duplicator to the transmitter, when the AF mode is selected as the relay mode, and connects the symbol duplicator to the FFT operator, when the DF mode is selected as the relay mode.

20. The RS apparatus of claim 17, wherein the channel estimator estimates one of an eigenvalue and mutual information of the relay links for the respective antennas by receiving header information of the received signals.

21. The RS apparatus of claim 17, wherein the relay mode selector selects one of the AF mode, the DF mode, selection decode and forward (SDF) mode, and incremental amplify and forward (IAF) mode as the relay mode for the respective antennas.

22. The RS apparatus of claim 21, wherein the transmitter comprises:
   a power amplifier which amplifies a power of the received signals, when the AF mode is selected as the relay mode;
   an encoder which encodes the received signals, when the DF mode is selected as the relay mode; and
   an inverse Fast Fourier Transform (IFFT) operator which IFFT-processes the encoded signals.

23. The RS apparatus of claim 9, wherein the estimated channel status value includes one of an eigenvalue, mutual information, and a probability error.

24. The RS apparatus of claim 17, wherein the estimated channel status value includes one of an eigenvalue, mutual information, and a probability error.

* * * * *